United States Patent [19]

Frost et al.

[11] 3,998,505
[45] Dec. 21, 1976

[54] BEARING HOUSING ASSEMBLY AND METHOD THEREOF

[75] Inventors: Charles C. Frost; Siegfried K. Weis, both of Grand Rapids, Mich.

[73] Assignee: C. L. Frost & Son, Inc., Grand Rapids, Mich.

[22] Filed: Aug. 15, 1975

[21] Appl. No.: 605,168

Related U.S. Application Data

[60] Continuation of Ser. No. 498,381, Aug. 19, 1974, Pat. No. 3,926,485, which is a division of Ser. No. 355,598, April 30, 1973, Pat. No. 3,844,010.

[52] U.S. Cl. .......................... 308/195; 29/148.4 R; 308/189 R
[51] Int. Cl.² .................. F16C 33/60; B21D 53/12
[58] Field of Search ......... 308/15, 189 R, 193–196; 29/148.4, 159

[56] References Cited

UNITED STATES PATENTS

| 1,559,830 | 11/1925 | Woodall | 308/195 |
| 3,672,737 | 6/1972 | Jacob | 308/196 |

*Primary Examiner*—M. H. Wood, Jr.
*Assistant Examiner*—Richard A. Bertsch
*Attorney, Agent, or Firm*—Price, Heneveld, Huizenga & Cooper

[57] ABSTRACT

Molded plastic bearing housing formed as two individual sections at least one of which is adapted for placement over a bearing. The individual sections are each provided with mating, annular flange members which are fitted together and ultrasonically welded to form an integral one-piece bearing housing. Alternately, the individual sections are provided with matching annular projections which are positioned in abutting relationship and ultrasonically welded to form an integral bearing housing.

13 Claims, 9 Drawing Figures

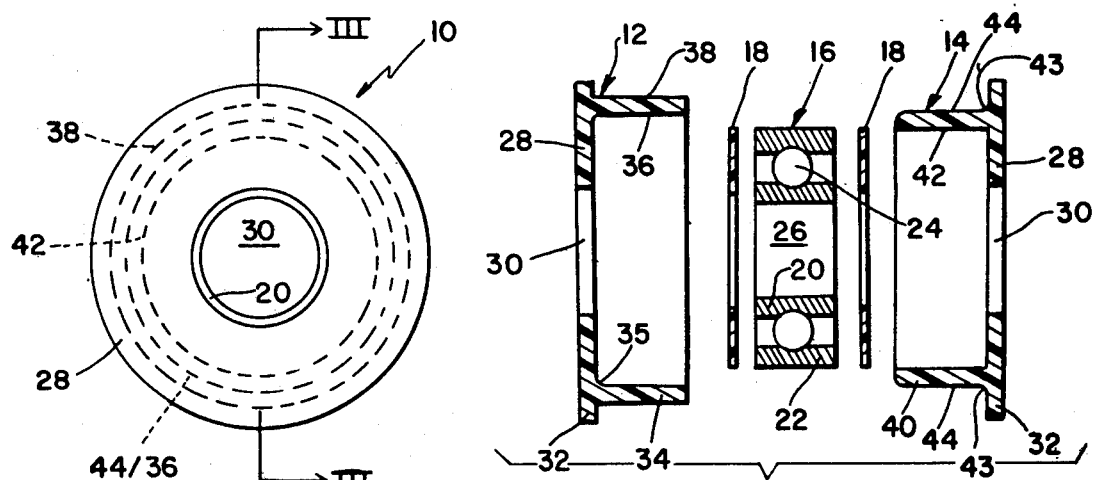
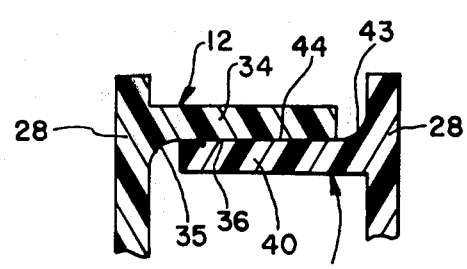
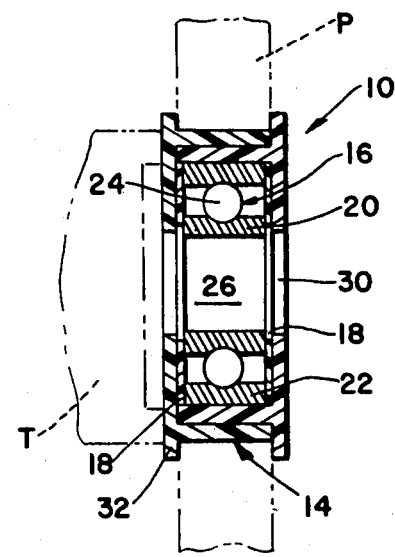

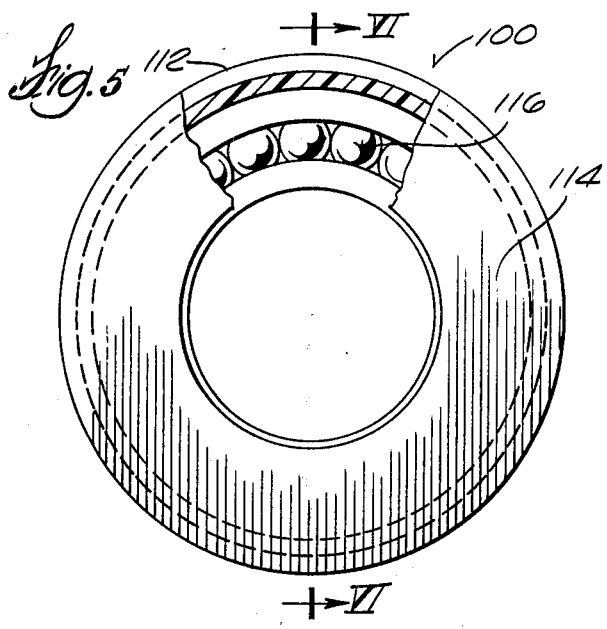
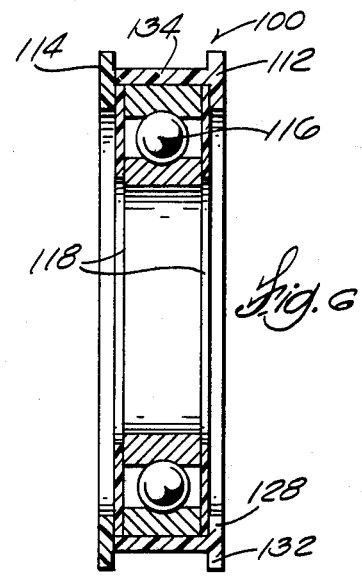
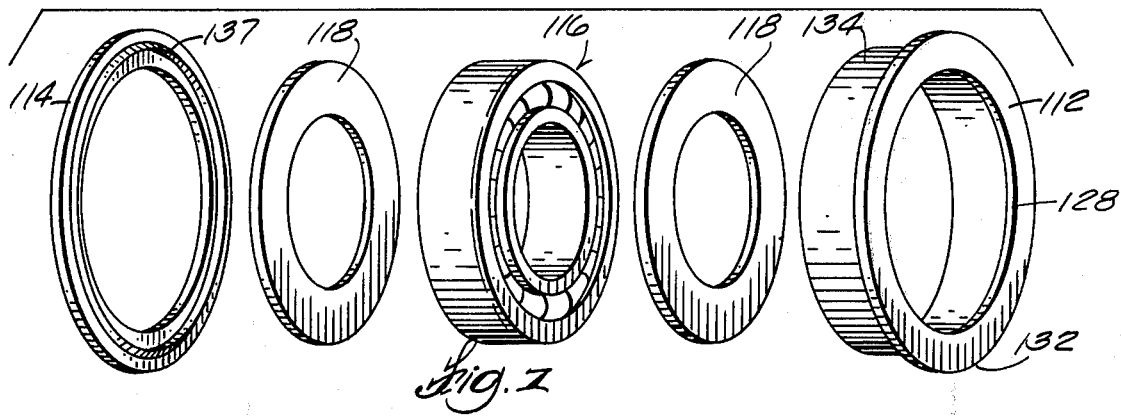
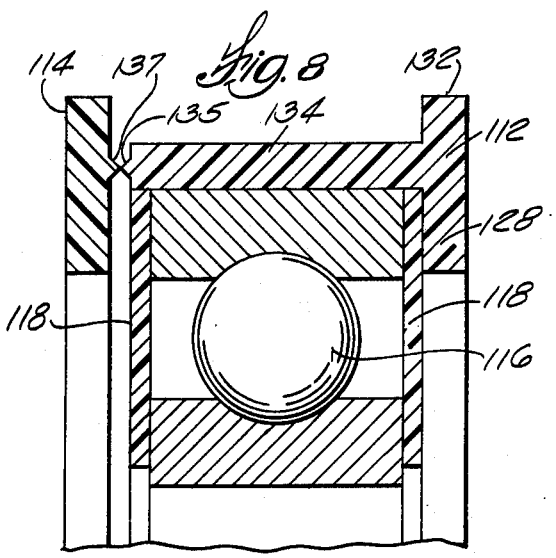
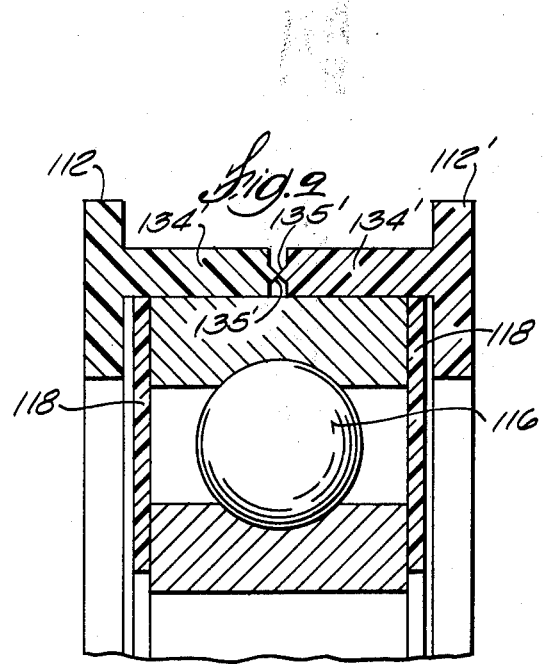

BEARING HOUSING ASSEMBLY AND METHOD THEREOF

CROSS REFERENCE TO RELATED APPLICATIONS

This is a continuation in part of Application Ser. No. 498,381, filed Aug. 19, 1974 entitled BEARING HOUSING ASSEMBLY, now U.S. Pat. No. 3,926,485, issued Dec. 16, 1975. which in turn is a division of Application Ser. No. 355,598, filed Apr. 30, 1973 entitled METHOD OF MAKING A BEARING HOUSING ASSEMBLY, now U.S. Pat. No. 3,844,010 issued Oct. 29, 1974.

BACKGROUND OF THE INVENTION

Bearings utilized in pulleys, sheaves and like rotating mechanisms may be held in position about the center or rotational axis of the mechanism in various ways. One common method of holding a bearing or the like involves a press fit construction wherein the bearing is pressed into an opening provided in the center of the rotatable mechanism. When plastic materials are utilized in this construction, a considerable amount of material is required for strength and to prevent premature failure. In addition, separate seals and shields must be provided in the bearing to contain lubricants and to prevent the entrance of contaminating materials.

SUMMARY OF THE INVENTION

The present invention provides a bearing housing and retainer made of a thermoplastic material which is fused together utilizing ultrasonic welding techniques to encapsulate the bearing. The bearing and housing construction is suitable for use as an individual bearing and housing for placement within a pulley or the like or alternately, depending upon its outer configuration, the fused material may be formed as an integral housing and pulley.

Accordingly, it is an object of the present invention to provide a method of forming a bearing housing utilizing ultrasonic welding techniques.

It is another object of the present invention to provide a method of forming a pulley having an integral bearing and housing utilizing ultrasonic welding techniques.

These and other important objects and advantages of this invention will become readily apparent to those skilled in the art upon reading the following specification with reference to the accompanying drawings in which:

FIG. 1 is a side elevational view of a bearing housing constructed in accordance with a first embodiment of present invention;

FIG. 2 is an exploded view of the housing and bearing shown in FIG. 1;

FIG. 3 is a cross-sectional view taken along the plane III—III of FIG. 1. illustrating the assembled bearing and housing;

FIG. 4 is an enlarged cross-sectional view of portions of the assembly shown in FIGS. 2 and 3;

FIG. 5 is a side elevational view similar to FIG. 1 illustrating a second embodiment of the invention;

FIG. 6 is a cross-sectional view taken along the plane VI—VI of FIG. 5 illustrating the assembled bearing and housing;

FIG. 7 is an exploded view of the bearing and housing shown in FIGS. 5 and 6;

FIG. 8 is an enlarged fragmentary cross-sectional view of a portion of the assembly shown in FIGS. 5 and 6; and FIG. 9 is an enlarged fragmentary cross-sectional view similar to FIG. 8 illustrating a third embodiment of the invention.

DESCRIPTION OF THE PREFERRED EMBODIMENT

Referring now to the drawings, the bearing housing assembly 10 includes a pair of annular cup-shaped members 12 and 14, a bearing 16, and a pair of bearing seals 18. The bearing 16 may be of conventional construction having an inner race 20 and an outer race 22 separated by rolling elements 24. An opening 26 in the inner race is provided to accept a shaft (not shown) or the like upon which the bearing and housing is to rotate. The cup-shaped members 12 and 14 are preferably fabricated or molded of a thermo-plastic material preferably a synthetic fibre-forming polyamide commonly known as nylon.

The members 12 and 14 are essentially identical in shape, each including a flat circular bottom wall 28 having an opening 30 formed in the central portion. The opening 30 is slightly larger than the inner diameter 26 of the bearing 16 which is to be enclosed therein. The bottom walls 28 extend radially outwardly a distance from the opening 30 to form an outer peripheral flange or rim 32. A slight distance radially inwardly from the flange 32 an annularly extending side wall is formed. The annular side wall 34 on member 12 includes an inner wall surface 36 and an outer wall surface 38. The annular side wall 49 on member 14 extends outwardly a distance from the bottom wall 28 and also includes an inner wall surface 42, an outer wall surface 44. Outer wall surface 44 of member 44 is adapted to mate with the inner wall surface 36 of member 12 (FIG. 3). In a preferred embodiment, a radius 35 is provided at the intersection of side wall inner surface 36 and bottom wall 28. A similar radius 43 is provided on member 14 at the intersection of outer wall surface 44 and bottom wall 28. The side walls 34 and 40 are of such a length that when the members are pressed together as shown in FIG. 3, their outer extremities are closely adjacent bottom walls 28, i.e., positioned on the radii 35 and 43. The inner diameter of member 14 formed by the inner surfaces 42 of wall 40 corresponds to the diameter of the outer race 22 of bearing 16. The outer diameter of wall 40 defined by wall surface 44 is slightly less than the inner diameter of the wall 34 defined by the inner wall surface 36 of member 12.

To assemble the bearing housing, a first bearing seal 18 is positioned within the inner diameter of member 14 adjacent the end wall 28. The bearing 16 is then pressed into the inner diameter of member 14 and a second bearing seal 18 is positioned adjacent the bearing. Member 12 is then positioned over member 14 so that the wall surfaces 36 and 44 are in contact with each other as illustrated in FIG. 3 and the bearing is securely held therebetween.

After the members 12 and 14 are assembled, they are fused together to form an integral housing about the bearing. The fusing or welding of the members takes place between the inner wall surface 36 of member 12 and the outer wall surface 44 of member 14. This is accomplished through the utilization of a conventional ultrasonic welding apparatus. An ultrasonic tool or transducer T (shown in phantom in FIG. 3) is preferably annular in shape and is adapted for placement against a side wall 28 of one of the members 12 and 14 to encompass an area in alignment with the wall surfaces 36 and 44. As is known to those skilled in the art, the transducer connects electrical inputs from a generator into ultrasonic mechanical vibrations, i.e., 20,000 CPS or higher. As the transducer is pressed against the surface in alignment with the walls 34 and 40, the vibrations are transmitted from the transducer through the material to the interface between surfaces 36 and 44. The vibrations between the surfaces create frictional heat which is generated in the form of a complex of shear and compression waves to melt and fuse the adjacent surfaces.

As illustrated in FIG. 4, the leading edges of wall surfaces 36 and 44 are in contact with the radii 35 and 43. As the ultrasonic vibrations occur, the members 12 and 14 are pressed together. The radii 35 and 43 melt because of the vibration between the leading edges and the radii and the melted radius material flows between the wall surfaces 36 and 44. As the radii 35 and 43 melt, the leading edges of the side walls move to the bottom wall 28 and become fused therewith. Simultaneously, the wall surfaces 36 and 44 fuse together. The members 12 and 14 form an integral unit to seal and hold the bearing in a nearly instantaneous operation as welding fusion takes place.

Depending on the configuration of the surfaces formed between the flanges 32 and the outer diameter of wall 34, the bearing and housing thus formed may be utilized as a pulley wheel. Alternately, the housing may be assembled within the central opening of a larger diameter pulley or other rotating member P (illustrated in phantom in FIG. 3). When assembled in a larger diameter rotating mechanism, the member 12 is first placed in the opening of the wheel with the flange 32 resting against one of its sides. The remaining components, seals 18, bearing 16 and member 14 are then pressed into member 12 from the opposite side and the ultrasonic welding operation described above is performed.

DESCRIPTION OF ALTERNATE EMBODIMENTS.

With reference to FIGS. 5–7, an alternate embodiment of the invention is disclosed wherein the housing sections are each provided with annular projections adapted for mating engagement such that when positioned together and an ultrasonic force is applied, fusion takes place and an integral housing is provided about the bearing. The bearing assembly 100 includes an annular cup shaped member 112, a cap 114, a bearing 116 and a pair of bearing seals 118. As in the previous embodiment, the bearing 116 is of conventional construction having an inner race and an outer race separated by a plurality of rolling elements. The cup shaped member 112 and cap 114 are preferably fabricated or molded of a thermoplastic material as nylon.

The cup shaped member 112 includes a flat circular bottom wall 128 having an opening formed through its central portion slightly larger than the inner diameter of the bearing 116 which is to be enclosed therein. Bottom wall 128 extends radially outwardly to form an outer peripherial flange or rim 132. An annularly extending side wall 134 is formed a slight distance radially inwardly from flange 132 to form the sides of the cup shaped member 112. The annular side wall extends outwardly from bottom wall 128, a distance corresponding generally to the combined thickness of bearing 116 and seals 118. The outermost end or leading edge of wall 134 is molded to include an annular outwardly extending projection 135 (FIG. 8) surrounding the cavity into which the bearing is received.

Cap member 114 is also fabricated from thermoplastic material as nylon and is in the shape of a generally flat annular disc corresponding in configuration generally to the bottom wall 128 of the cup member. An opening is formed through the center of the cap corresponding generally to the opening formed through the cup member 112. Cap member 114 is equipped with a raised annular projection 137 which corresponds in configuration to the raised projection 135 formed on wall 134 of cup 112. As shown in FIG. 8, projections 135 and 137 are adapted for engagement such that when the bearing 116 and seals 118 are positioned within cup member 112, the cap 114 may be positioned thereover with projections 135 and 137 in abutting relationship. After the members 112 and 114 are assembled as shown in FIG. 8, they are fused together to form the integral housing about the bearing. Thus fusing or welding of the members takes place between annular projections 135 and 137 and is accomplished through the utilization of a conventional ultrasonic welding apparatus as previously described in connection with the embodiment shown in FIGS. 1–4.

In the modified embodiment shown in FIG. 9, a pair of annular cup shaped members 112' each have an identical configuration and are each equipped with an annular projection 135' at the top of wall 134' surrounding the bearing receiving cavity.

The bearing 116 and seals 118 are positioned therebetween in the manner previously described. In this embodiment, as in the previous embodiments, the annular projections 135 and 137 are fused together through the utilization of a conventional ultrasonic welding apparatus.

As in the previous embodiments, depending upon the configuration of the surfaces formed between flanges 132 and the outer diameter of wall 134, the bearing and housing thus formed may be utilized as a pulley wheel or assembled in a larger diameter rotating mechanism. Additional applications of the invention will occur to those skilled in the art. For example, in the construction of a pillow block assembly, the two halves of the pillow block are formed of thermoplastic material and ultrasonically welded about a bearing. In another application of the invention, ultrasonically welded plastic parts are used to close a pair of stamped raceways in a bearing assembly to hold them together as a single roll full ball complement bearing assembly.

From the foregoing description and drawings, it will become readily apparent to those skilled in the art that the present invention provides a rapidly fabricated economical bearing housing. Lubricants contained in the bearing are completely sealed within the housing and the construction of the members 12 and 14, FIGS. 1–4, or the cup member 112 and cap 114 as shown in FIGS. 5–8, securely hold the bearing, the seal and forms a shield around the bearing thereby reducing bearing costs by eliminating the necessity of an integral bearing shield. The reduction in manufacturing costs is, of course, a significant aspect of this invention as the bearing housing is completely assembled in one simple operation. Material costs are also significantly reduced as the members forming the housing are easily and relatively inexpensively molded of thermo-plastic materials.

Other modifications, variations and the many advantages of the present invention will be suggested to those skilled in the art without departing from the scope of the invention which is defined by the following claims.

The embodiments of the invention in which an exclusive property or privilege is claimed are defined as follows.

1. A bearing housing comprising: a pair of thermoplastic members, at least one of said members having a flat planar bottom wall portion and an annular outwardly extending side wall portion haaving a leading edge portion; said side wall portion having an inner wall surface thereon forming a cavity adapted to receive a bearing; an annular projection integrally formed on said leading edge of said wall surface surrounding said cavity; said other of said members having an annular projection formed thereon corresponding to said projection surrounding said cavity, said projection on said other of said members and said projection surrounding said cavity being fused to each other to form an integral housing about a bearing.

2. The bearing housing of claim 1 wherein said annular outwardly extending side wall portion on said one member extends a distance approximately equal to the thickness of a bearing, said first annular projection on said leading edge extending therebeyond; said other of said members comprising a flat planar member, said annular projection being formed on a side thereof.

3. The bearing housing of claim 1 wherein said other of said members includes a generally flat planar base portion and an annular outwardly extending side wall portion, said side wall portion defining a cavity to cooperatively receive a bearing within said cavity in said one of said members; an annular projection integrally formed on a leading edge of said wall portion and surrounding said opening of said other of said members; said annular projection on said one member and said other member being fused together along the width of a bearing positioned therein to thereby form an integral housing about the bearing.

4. The bearing housing of claim 3 wherein said bottom wall portions of each of said members extend radially outwardly from said side wall portions to cooperatively form a belt-receiving groove between said side walls.

5. The bearing housing of claim 1 wherein said pair of thermoplastic members are identical in configuration.

6. The bearing housing assembly comprising: a first thermoplastic flange-like member having a generally flat, planar base portion and an annular wall portion extending generally perpendicular to said base, said annular wall portion defining an opening to receive a bearing member; an annular projection integrally formed on an outer edge of said wall portion and surrounding said opening; a second thermoplastic member, said second member having an annular projection formed theron corresponding to said annular projection on said first member, said annular projections on said first and said second members being fused to each other to thereby form an integral housing about the bearing.

7. The bearing housing of claim 6 wherein said annular wall portion on said first member extends a distance approximately equal to the thickness of a bearing, said first mentioned annular projection extending therebeyond, said second member comprising a flat planar member, said annular projection being formed on a side thereof.

8. The bearing housing of claim 7 wherein said first and said second members are identical in configuration.

9. The bearing housing of claim 6 wherein said second thermoplastic member includes a generally flat planar base portion and an annular wall portion extending generally perpendicular to said base, said annular wall defining an opening to cooperatively receive a bearing member with said opening in said first member; an annular projection integrally formed on an outer edge of said wall portion on said second member and surrounding said opening, said annular projection on said first and said second members being fused together along the width of a bearing positioned thereon to thereby form an integral housing about the bearing.

10. The bearing housing of claim 9 wherein said bottom wall portions of each of said members extend radially outwardly from said side wall portions to cooperatively form a belt-receiving groove between said side walls.

11. The method of assembling a housing about a bearing or the like comprising
   a. providing a pair of molded thermoplastic housing members, at least one of said members having a flat, planar bottom wall portion and an annular outwardly extending side wall portion having a leading edge portion, said side wall portion having an inner wall surface forming a cavity to receive a bearing, an annular projection integrally formed on the leading edge of said wall surface surrounding said cavity and a corresponding annular projection on said other member;
   b. placing a bearing in the cavity of said housing member; and
   c. fusing said annular projection on said one of said members to the annular projection on said other of said members to thereby form an integral housing about said bearing.

12. The method of forming a bearing housing as defined in claim 11 wherein the step of fusing the annular projection on said one member to the annular projection on said other member is accomplished by ultrasonically vibrating said members to create frictional heat and resultant fusion between said annular projections.

13. The method as defined in claim 12 and further including the step of positioning a bearing seal between said bearing and said bottom wall portion prior to fusing said members together.

* * * * *

UNITED STATES PATENT AND TRADEMARK OFFICE
CERTIFICATE OF CORRECTION

PATENT NO. : 3,998,505
DATED : December 21, 1976
INVENTOR(S) : Charles C. Frost and Siegfried K. Weis It is certified that error appears in the above–identified patent and that said Letters Patent are hereby corrected as shown below:

Column 2, line 33;

"49" should be --40--;

Column 2, line 36;

"44" (third occurrence) should be --14--;

Column 5, line 11;

"haaving" should be --having--.

Signed and Sealed this

Twenty-sixth Day of April 1977

[SEAL]

Attest:

RUTH C. MASON
Attesting Officer

C. MARSHALL DANN
Commissioner of Patents and Trademarks